United States Patent
Schirm et al.

(10) Patent No.: US 7,580,821 B2
(45) Date of Patent: Aug. 25, 2009

(54) APPLICATION PROGRAMMING INTERFACE FOR FLUID SIMULATIONS

(75) Inventors: Simon Schirm, Zürich (CH); Richard Tonge, St. Louis, MO (US)

(73) Assignee: NVIDIA Corporation, Santa Clara, CA (US)

( * ) Notice: Subject to any disclaimer, the term of this patent is extended or adjusted under 35 U.S.C. 154(b) by 625 days.

(21) Appl. No.: 11/340,606

(22) Filed: Jan. 27, 2006

(65) Prior Publication Data

US 2007/0038424 A1    Feb. 15, 2007

Related U.S. Application Data

(60) Provisional application No. 60/706,747, filed on Aug. 10, 2005.

(51) Int. Cl.
G06G 7/48 (2006.01)
G06G 7/50 (2006.01)

(52) U.S. Cl. ............... 703/9; 703/5; 345/473; 463/31

(58) Field of Classification Search ........ 703/9
See application file for complete search history.

(56) References Cited

U.S. PATENT DOCUMENTS

| | | | |
|---|---|---|---|
| 5,938,530 A * | 8/1999 | Watanabe | 463/31 |
| 6,014,151 A * | 1/2000 | Cohen et al. | 345/474 |
| 6,348,924 B1 * | 2/2002 | Brinsmead | 345/441 |
| 6,748,349 B1 | 6/2004 | Majumdar et al. | |
| 6,789,167 B2 * | 9/2004 | Naffziger | 711/118 |
| 7,372,463 B2 * | 5/2008 | Anand | 345/473 |
| 2003/0028510 A1 | 2/2003 | Franke | |
| 2004/0210429 A1 | 10/2004 | Yu et al. | |
| 2005/0075154 A1 | 4/2005 | Bordes et al. | |
| 2005/0086040 A1 | 4/2005 | Davis et al. | |
| 2005/0231512 A1 * | 10/2005 | Niles et al. | 345/473 |

OTHER PUBLICATIONS

Telekinesys Research Ltd., "Havok Game Dynamics SDK", Telekinesys Research Ltd. 2002.*
Muller et al,("Interactive Blood Simulation For Virtual Surgery Based on Smoothed Particle Hydrodynamics", Journal of Technology and Healthcare, 12(1), Feb. 25-31, 2004.*
Chabukswar et al, "Multi-threaded Rendering and Physics Simulation", Intel Software Solutions Group, Feb. 2005.*

(Continued)

*Primary Examiner*—Paul L Rodriguez
*Assistant Examiner*—Mary C Jacob
(74) *Attorney, Agent, or Firm*—Patterson & Sheridan, LLP

(57) ABSTRACT

A method is disclosed for executing a physics simulation in a system comprising a computational platform, a main application stored in the computational platform, a secondary application stored in the computational platform, and a smoothed particle hydrodynamics (SPH) application programming interface (API) implemented in the computational platform. The method defines a SPH call in the SPH API, and by operation of the main application, invokes a software routine using the SPH call. Additionally, by operation of the secondary application, a state of the physics simulation is updated in response to the software routine.

52 Claims, 6 Drawing Sheets

OTHER PUBLICATIONS

Amada et al, "Particle-Based Fluid Simulation on GPU", ACM Workshop on General-Purpose Computing on Graphics Processors and SIGGRAPH 2004 Poster Session, LA, California, 2004.*

Andersson, Lars ("Real-Time Fluid Dynamics for Virtual Surgery", Master's Thesis, Department of Computer Engineering, Chalmers University of Technology, Jan. 2005.*

Desbrun et al, "Smoothered Particles: A New Paradigm for Animating Highly Deformable Bodies", Proceedings of the Eurographics Workshop on Computer Animation and Simulation, pp. 61-76, 1996.*

Müller, et al. "Particle-Based Fluid Simulation for Interactive Applications", Proceedings of the 2003 ACM SIGGRAPH/Eurographics Symposium on Computer Animation, Jul. 26-27, 2003, San Diego, CA. 7 pgs.

International Search Report. Jul. 11, 2008.

* cited by examiner

APPLICATION PROGRAMMING INTERFACE FOR FLUID SIMULATIONS

This application claims the benefit of U.S. Provisional Application No. 60/706,747 filed Aug. 10, 2005, the subject matter of which is hereby incorporated by reference.

BACKGROUND OF THE INVENTION

1. Field of the Invention

The present invention relates generally to an application programming interface (API) for performing physics simulations. More particularly, the invention relates to an API for performing particle-based fluid simulations.

2. Description of the Related Art

An Application Programming Interface (API) is a set of definitions and/or protocols used to generate computer software applications (hereafter, applications). In general, an API defines how an application communicates with other software in a computer system. For example, an API may define how an application accesses (e.g., invokes, calls, references, modifies, etc.) a set of software components (e.g., functions, procedures, variables, data structures, etc.) in the system. Alternatively, an API may also define how an application interacts with a piece of software such as an interpreter (e.g., a JavaScript Interpreter).

An API typically takes the form of a set of "calls", data structures, and variables that can be included in an application. The term "call" is used herein to denote any part of an application (e.g., an instruction, a code fragment, etc.) causing initiation, execution, retrieval, storage, indexing, update, etc. of another piece of software. In other words, including a particular call in an application generally causes the application to access a software component associated with the call.

The term "application" is used throughout this written description to describe any piece of software that enables at least one function in a computational platform. For example, an application typically comprises a data file that enables some function by providing a set of instructions for performing the function. The terms "routine" and "subroutine" are used to denote a part of an application smaller than the whole application. Each routine or subroutine in an application may comprise one or more subroutines and/or one or more calls to other software components as previously defined in this specification.

A classic example of a call included in an application is a "function call". A function call generally comprises a name of a function and zero or more parameters or arguments for the function. When an application including the function call is executed, the function is invoked with its accompanying arguments.

The set of software components that can be accessed using a particular API is referred to as the implementation of the API. The implementation of an API may include, for example, a software library designed to run on a particular system. In general, an API is not bound to any one particular implementation. In fact, an application may be written using a particular API so that the application may be ported to systems with different implementations of the API. For instance, an API defined by the Open Graphics Library (OpenGL) standard allows programmers to write graphics applications that run on both UNIX and Windows based platforms, even though the underlying implementation of the API is different on each platform.

In general, the implementation of one API can be constructed with calls from another API. For example, an API defining complex high-level functions can be implemented using API calls defining intermediate-level functions. The API defining intermediate-level functions can be implemented using API calls defining low-level functions, and so on.

The implementation of most APIs is distributed in one of two ways. The first way is to include the implementation as part of a computer's operating system. For example, the implementation could comprise a set of code libraries distributed with the operating system. The second way is to distribute the implementation as a separate application or as an executable or a code library that has to be linked with and/or compiled with an application.

In some cases, source code for an API's implementation is available for viewing and modification. Where an API's implementation is available in this way, the API is called "open source". In other cases, the API is only available as a set of binary files or the like, and hence, the only way to access the API is by including calls defined by the API in an application.

The term "software development kit" (SDK) is often used interchangeably with the term "API" because a SDK comprises a set of tools (e.g., an API) used to create software applications. However, a SDK generally comprises additional tools for developing applications besides an API. For instance, a software development kit may include utilities such as a debugger, or it may include special hardware tools used to communicate with embedded devices.

Most operating systems provide APIs that allow application programmers to create and/or control various system objects, such as display graphics, memory, file systems, processes, etc. In addition, operating systems may also provide APIs for performing common tasks such as multimedia processing, networking functions, and so forth.

Many independent software and/or hardware applications also provide APIs that allow application programmers to interface (e.g., control, communicate, etc.) with them. For example, an API used for communicating with a peripheral device such as a camera may define calls used to access low level software for adjusting specific aspects of the camera such as its aperture, shutter speed, exposure time, etc.

FIG. 1 is a conceptual illustration of a software architecture 100 for a system including an API. In FIG. 1, a plurality of applications 101 access a plurality of software components (API routines) 104 using an API 102. API routines 104 form a part of the implementation of API 102 and are located in an operating system or application 103.

FIG. 2 is a conceptual illustration of a conventional system 200 used to run applications containing calls from an API 205. In this written description, the term "run" describes any process in which hardware resources associated with a computational platform perform an operation under the direction (directly or indirectly) of a software resource.

Referring to FIG. 2, system 200 comprises a central processing unit (CPU) 201 operatively connected to an external memory 202. External memory 202 stores an application 203, API 205, and a plurality of API routines 206. Application 204 invokes API routines 206 using API calls 204 defined by API 205. As indicated by broken boxes in FIG. 2, application 204 and API routines 206 run on CPU 202.

Using an API to write applications is advantageous for various reasons. For example, a good API generally provides a level of abstraction between an application programmer and the low level details of the software components called by the API. An API also generally provides access to commonly used functionalities (e.g., creating display graphics, formatting text, spawning processes) so that application programmers do not have to implement these functionalities from scratch. Moreover, since an API is not bound to a particular implementation, APIs generally allow applications to be ported between different systems. In addition, APIs provide standard representations for various programming tasks, which allows different programmers to work on an application without having to relearn all the calls contained therein.

Because of the various advantages provided by APIs, most specialized application areas in the field of computer science/engineering have associated APIs. The calls provided by an API serve as building blocks for creating applications of increasing complexity within the application area. For example, in computer graphics, low level APIs such as OpenGL and DirectX define functions for rendering primitive graphics components such as polygons and other shapes. Graphics programmers such as video game programmers then build upon the functions defined by the low level APIs to create higher level APIs defining functions for performing higher level tasks such as complex character animations. Accordingly, developing effective APIs increases the scope of what can be produced by application programmers within an application area.

An emerging application area where APIs are still in the primitive stages of development is the area of computational physics simulations. Computational physics simulations are used for a variety of purposes, ranging from scientific visualization to three dimensional (3D) game animation.

The goal of computational physics simulations is to model interactions between objects in a virtual world using the laws of physics. For example, in the case of scientific visualization, the physical forces and interactions between the elements of a polypeptide chain may be computationally modeled and observed in order to predict the conformation (e.g., folding) of a particular protein. In the case of 3D game animation, the physical forces and interactions between actors (e.g., characters, objects, substances, etc.) in a scene and their environment is modeled in order to generate lifelike animations of the scene. Simulations of forces such as gravity, pressure, friction, chemical forces, etc. can be combined to create lifelike animations of collisions, falling objects, explosions, and so forth.

Formally defined, a "physics simulation" is a virtual representation of a physical entity or entities that changes over time in accordance with the laws of physics. For example, FIG. 3 illustrates a physics simulation wherein a "world state" 301 is periodically updated according to a step function 302 to yield an "updated world state" 303. World state 301 typically includes a set of objects having a number of associated physical attributes such as a size, shape, mass, location, velocity, acceleration, density, etc. World state 301 also typically includes a set of forces acting on each of the objects. The forces may include, for example, gravity, pressure, friction, magnetic attraction/repulsion, etc. In step function 302, the objects are allowed to evolve, i.e., change physical attributes, for a predetermined time step in accordance with their associated velocities, forces, etc. A resulting new set of physical attributes and forces constitute updated world state 303. Step function can then be repeated to generate further world states from updated world state 303.

Examples of APIs designed to execute physics simulations include Havok Physics 3 (HP3). HP3 defines routines for performing collision detection, dynamics and constraint solving, and vehicle dynamics in a physics simulation.

One interesting problem that has not been adequately addressed by currently available APIs is the problem of simulating fluids (e.g., gases and liquids). A fluid simulation is a representation of a fluid that changes over time in accordance with the laws of physics. Because fluids may experience a host of complicated phenomena such as convection, diffusion, turbulence, and surface tension, simulating fluids can be difficult.

A common approach to simulating fluids is to represent a fluid as a set of particles, each having an associated set of physical attributes such as size, mass, velocity, location, and a set of forces acting on it. FIG. 4 illustrates a fluid simulation wherein the fluid is represented as a set of particles.

Referring to FIG. 4, the set of physical attributes and forces associated with the particles constitute a fluid state 401. A step function 402 acts on the particles for a predetermined time step so that the fluid will evolve in accordance with the velocities and forces associated with each particle. Accordingly, an updated fluid state 403 is generated after the predetermined time step.

In most practical scenarios, the fluid simulation is coupled to an output for displaying or evaluating properties of the simulated fluid. For example, in FIG. 4, updated fluid state 403 is transformed into an image 405 by a display function 404. Image 405 could be generated, for example, by transforming the set of particles representing the fluid into a mesh representing a surface of the fluid and then rendering the mesh using standard graphics rendering hardware.

One particularly difficult problem relating to fluid simulations is being able to generate the fluid simulations in real-time. Real-time fluid simulations form an important part of many interactive computer environments such as medical simulations and video games. Unfortunately, conventional systems and methods have failed to produce satisfactory real-time fluid simulations because of the computational cost of simulating all of the forces on each particle and the lack of optimized hardware and software for performing the same.

SUMMARY OF THE INVENTION

Embodiment of the invention recognize the need for an API allowing programmers to incorporate realistic fluid simulations into their applications. The invention further recognizes the need for a system adapted to efficiently run applications written with the API.

In one embodiment, the invention provides a method of executing a physics simulation in a system comprising a computational platform, a main application stored in the computational platform, a secondary application stored in the computational platform, and a smoothed particle hydrodynamics (SPH) application programming interface (API) implemented in the computational platform. The method comprises defining a SPH call in the SPH API, by operation of the main application, invoking a software routine using the SPH call, and by operation of the secondary application, updating a state of the physics simulation in response to the software routine.

In another embodiment, the invention provides a system adapted to execute a physics simulation, the system comprising; a computational platform comprising at least one central processing unit and memory, a main application stored in the computational platform, a secondary application stored in the computational platform, a smoothed particle hydrodynamics (SPH) application programming interface (API) implemented in the computational platform, and a SPH call defined by the SPH API and included in the main application so as to invoke a software routine for updating a state of the physics simulation by operation of the secondary application.

BRIEF DESCRIPTION OF THE DRAWINGS

The invention is described below in relation to several embodiments illustrated in the accompanying drawings.

Throughout the drawings, like reference numbers indicate like exemplary elements, components, or steps. In the drawings.

DESCRIPTION OF THE EXEMPLARY EMBODIMENTS

The present invention recognizes the need for an API allowing programmers to incorporate realistic fluid simulations into their applications. The invention further recognizes the need for a system adapted to efficiently run applications written with the API.

The invention finds ready application in various application areas requiring lifelike fluid simulations, including, but not limited to application areas where the fluid simulations are computed in real-time. Exemplary application areas include, for example, computer games, medical simulations, scientific applications, and multimedia presentations such as computer animated films.

Exemplary embodiments of the invention are described below with reference to the corresponding drawings. These embodiments are presented as teaching examples. The actual scope of the invention is defined by the claims that follow.

Figure 5:
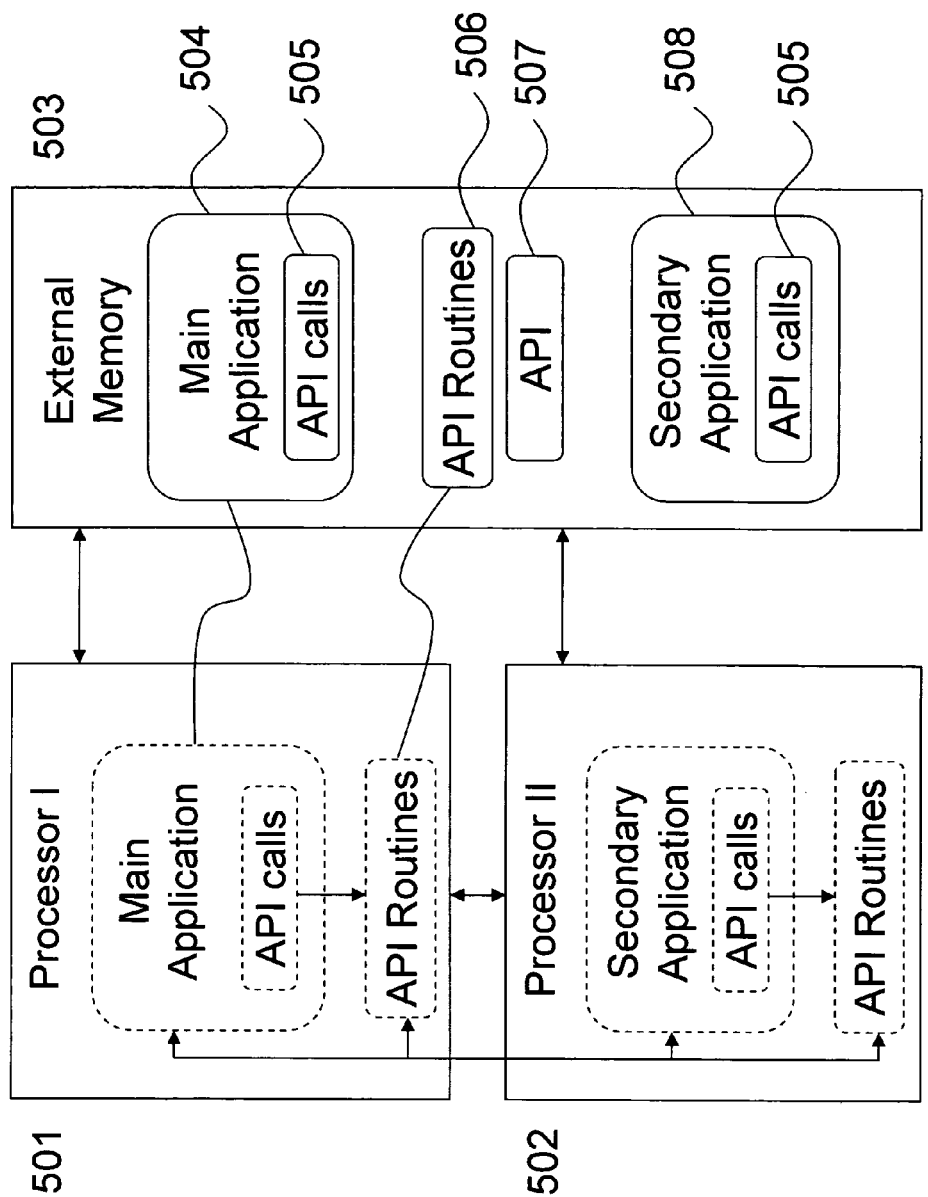
FIG. 5 shows a system adapted to run an application containing calls from a physics API in accordance with one embodiment of the present invention; and, FIG. 6 is a flowchart illustrating a method of executing a physics simulation in accordance with one embodiment of the present invention.

FIG. 5 shows a system adapted to execute a physics simulation according to one embodiment of the invention.

Referring to FIG. 5, the system comprises a computational platform including a first processor 501 and a second processor 502 operatively connected to each other and to an external memory 503. The term "computational platform" used herein refers broadly to any combination of computational hardware and memory used to process and store data. The term "processor" refers to a part of the computational platform (e.g., a logic circuit) used to process the data.

In one embodiment of the invention, first and second processors 501 and 502 comprise respective first and second CPUs operatively connected by a system bus. Accordingly, the first and second CPUs are generally located on a single printed circuit board (PCB).

In another embodiment of the invention, first and second processors 501 and 502 comprise a CPU and a co-processor operatively connected via a peripheral component interconnect (PCI) interface.

In yet another embodiment of the invention, first and second processors 501 and 502 comprise respective first and second cores of a dual core multiprocessor. In other words, first an second processors 501 and 502 are located on a single integrated circuit (IC) chip.

Although FIG. 5 shows two processors, the system could also comprise a single processor having at least two execution threads for executing multiple processes or applications in parallel.

The system of FIG. 5 further comprises a main application 504 and a secondary application 508 stored in an external memory 503. The system still further comprises an API 507 defining a set of API calls 505 used for invoking a corresponding set of API routines 506.

Main application 504 typically runs substantially on first processor 501 and secondary application 508 typically runs substantially on second processor 502. Main application 504 and secondary application 508 typically run in parallel and use asynchronous signaling to communicate with each other.

Figure 1:
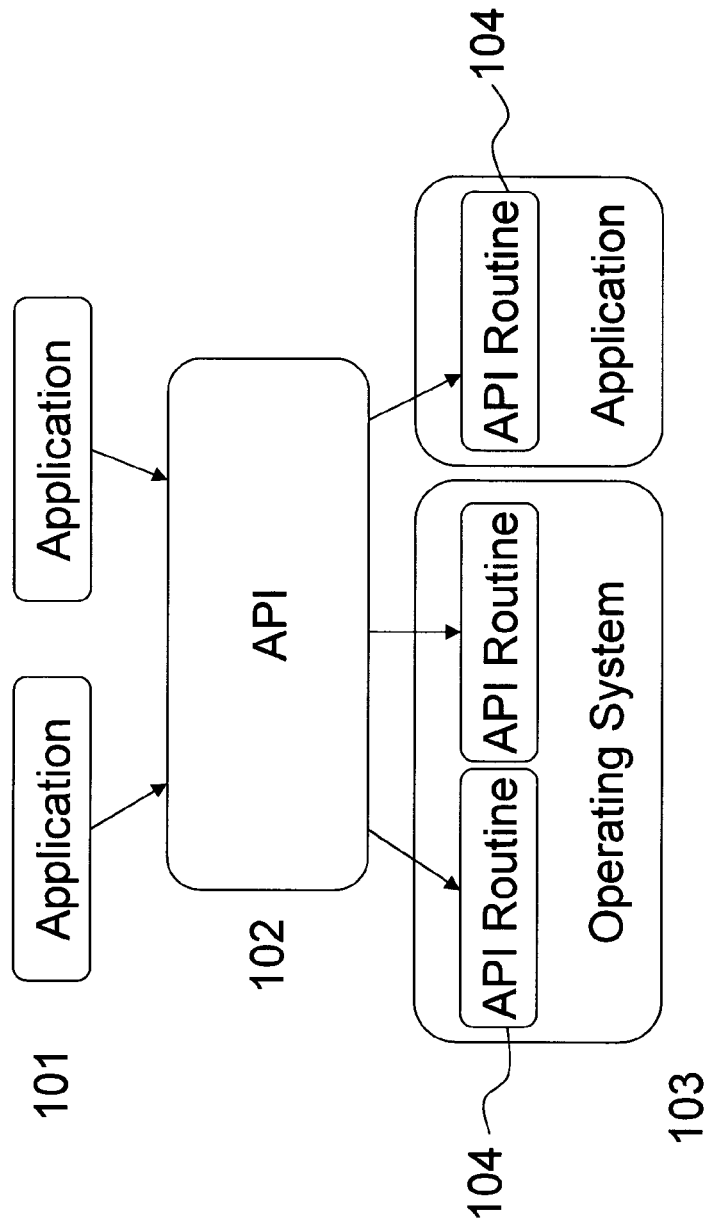
FIG. 1 is a conceptual illustration of a software architecture for a system including an API.
Figure 2:
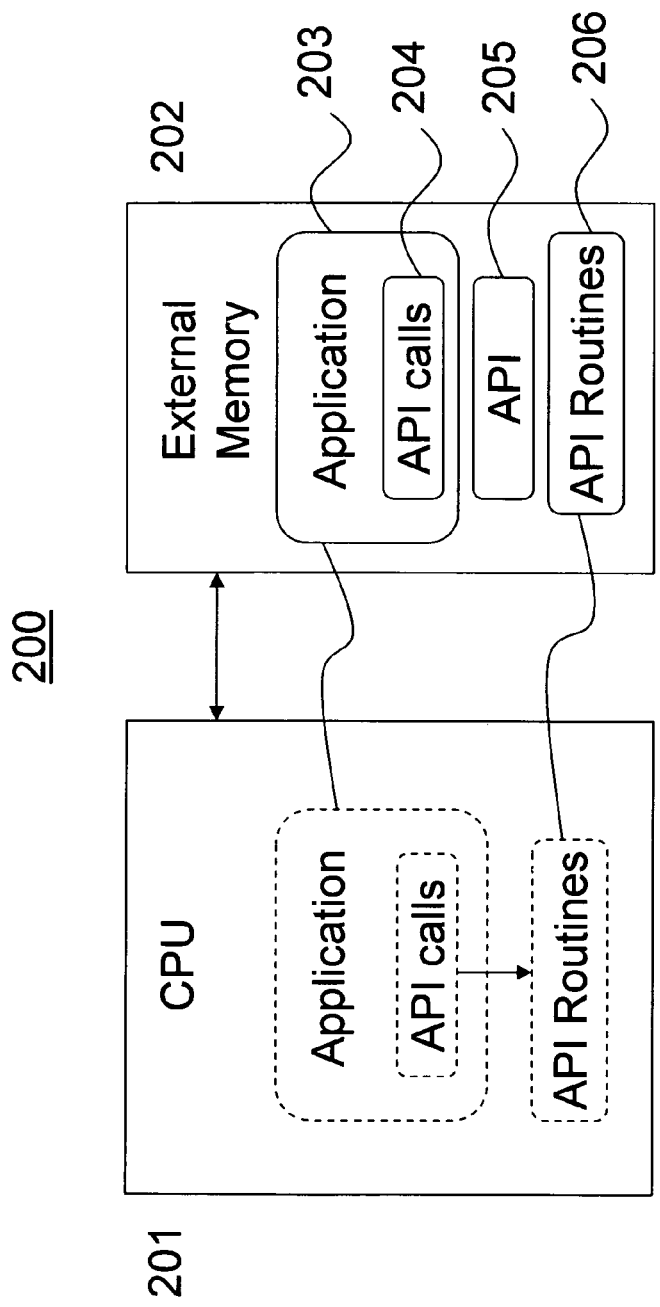
FIG. 2 shows a conventional system adapted to run an application containing calls from a particular API.
Figure 3:
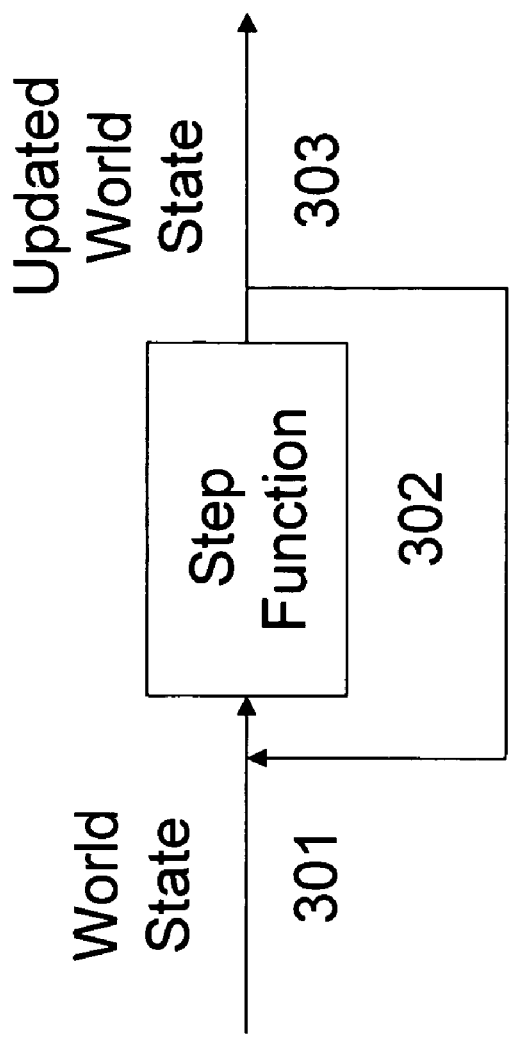
FIG. 3 is an illustration of one example of a physics simulation.
Figure 4:
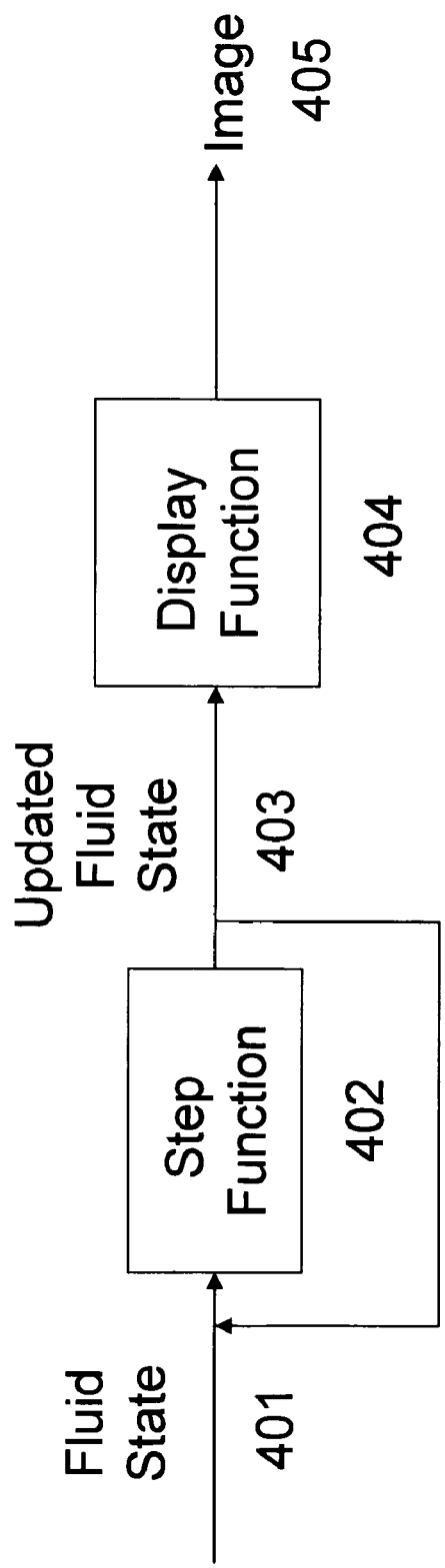
FIG. 4 is an illustration of one example of a fluid simulation.

For example, in one embodiment of the invention, main application 504 comprises a game program (i.e., a video game) and secondary application 508 comprises a physics simulation of a virtual environment (i.e., a world state) of the game program. The game program typically spawns or initiates the physics simulation, including any necessary initialization. Thereafter, the physics simulation runs in parallel with the game program, updating the world state according to a predetermined time step as illustrated in FIG. 3. Whenever the world state is updated, the physics simulation sends a signal to the game program indicating a change in various physical attributes of the game program's virtual environment. Similarly, the game program also sends signals to the physics simulation whenever various actors in the game program interact with their environment in a way that might affect the physics simulation.

At least one of main application 504 or secondary application 505 contains one of API calls 505. API calls included in main application 504 may cause API routines 506 to run on first processor 501 or on second processor 502. Likewise, API calls included in secondary application 508 may cause API routines 506 to run on first processor 501 or second processor 502.

API routines 506 are typically distributed as part of an operating system of the computational platform. However, API routines 506 may also be distributed as an independent application or a set of independent executables or code libraries that have to be linked and/or compiled with main application 504 and/or secondary application 508.

According to one embodiment of the invention, API calls 505 are defined by a smoothed particle hydrodynamics (SPH) API. The SPH API defines calls for creating and executing particle based fluid simulations.

In general, the term "smoothed particle hydrodynamics" denotes a way of modeling a fluid using a finite set of particles. In smoothed particle hydrodynamics, various quantities related to the fluid (e.g., forces, mass, velocity, etc.) are defined at discrete locations in space (e.g., at the locations of corresponding particles). Then, the values the respective quantities are distributed over local neighborhoods of their various locations. In other words, the quantities are interpolated (i.e., "smoothed") so that each quantity has a value defined at each location in space.

As an example of smoothed particle hydrodynamics, consider a set of particles defined at locations in a three-dimensional (3D) virtual world. Suppose that each particle has an associated mass, velocity, and acceleration. Further suppose that a plurality of forces (e.g., pressure and viscosity) and a density value are defined at the location of each of the particles. The values defined for each of the particles can be interpolated using a set of kernel functions such as radial basis functions centered at each of the particles' locations. Interpolating the values in this way generates continuous fields such as a pressure field and a viscosity field that can be used to compute the dynamics of the fluid using standard equations such as the Navier-Stokes equation. For example, one form of the Navier-Stokes equation models fluid dynamics as follows:

$$\rho\left(\frac{\partial v}{\partial t} + v \cdot \nabla v\right) = -\nabla p + \rho g + \mu \nabla^2 v. \quad (1)$$

In equation (1), the term "v" denotes the velocity of a particle, the term "ρ" denotes a density value of the particle, the term "p" denotes a pressure force on the particle, the term "g" denotes gravity, and the term "μ" denotes a viscosity of the fluid. A convective term v·∇v in equation (1) can be ignored because it is assumed that each particle moves together with the fluid. Accordingly, the above form of the Navier-Stokes equation reduces to the following equation (2) for particle based physics simulations:

$$\rho\left(\frac{Dv}{Dt}\right) = -\nabla p + \rho g + \mu \nabla^2 v, \quad (2)$$

where the term $$\frac{Dv}{Dt}$$

denotes the time derivative of the velocity of each particle. In other words, $$\frac{Dv}{Dt}$$

denotes the acceleration of the particle. By interpolating the various quantities to generate continuous fields, the gradients of the velocity and pressure fields can be generated for equation (2) to allow the acceleration of each particle to be computed.

In addition to the pressure, viscosity, and gravity forces mentioned above, fluids can also be simulated using other forces such as surface tension. A method of simulating a fluid using smoothed particle hydrodynamics to simulate a fluid is described in further detail, for example, in "Particle-Based Fluid Simulation for Interactive Applications" (Matthias Müller et al., Eurographics/SIGGRAPH Symposium on Computer Animation, 2003).

Where kernel functions are used to interpolate the various quantities in smoothed particle hydrodynamics, the kernel functions may only be defined over a finite radius in order to limit the computational cost of interpolating the quantities. Alternatively, kernel functions with finite support may be used to interpolate the quantities. In either case, "a radius of influence" defines the range of the kernel function with non-zero values defined. For example, in one implementation of smoothed particle hydrodynamics, space is divided into a 3D grid of cells and the radius of influence for each particle inside a particular cell is defined to be the cell itself. In one exemplary embodiment of the SPH API, the radius of influence for particles is stored in a data structure "kernelRadiusMultiplier" that can be modified by an associated software routine.

Among the calls defined by the SPH API are calls for introducing particles into a particle based fluid simulation. Particles are typically introduced into the fluid simulation in one of two ways: by explicitly adding the particles, or by creating an emitter in the simulation.

Particles can be explicitly added into a simulation by specifying various properties of the particles such as locations, velocities, and positions, and then passing the properties to a software routine through a SPH API call so that the software routine will add the particles to the fluid simulation. For example, the SPH API call could comprise a function call "addParticles(const NxParticleData&)", where "addParticles" is the name of a software routine for adding particles to the fluid simulation and "const NxParticleData&" is the type of a parameter denoting a reference to a data structure containing the locations, velocities, positions, and number of particles to be added to the fluid simulation.

Particles are added to a fluid simulation through an emitter by creating an emitter in the simulation that dispenses particles according to some predetermined pattern such as a rate. An emitter can be created by specifying various properties of the emitter such as size, location, pose, pressure, rate, etc., and passing the properties to a software routine through a SPH API call so that the software routine will create the emitter with the specified properties. For example, the SPH API call could comprise a function call "createEmitter(const NxFluidEmitterDesc&)", where "createEmitter" is the name of a function for creating an emitter in the particle simulation and "const NxFluidEmitterDesc&" is the type of a parameter denoting a reference to a data structure containing the properties of the emitter.

The size of an emitter generally refers to the size of a cross sectional area across which particles enter the fluid simulation from the emitter. The pose of the emitter generally refers to the rotational orientation of the emitter, and the location of the emitter denotes the location of the emitter in 3D space.

As an alternative to, or in addition to, specifying properties of the emitter in the "createEmitter" call, various properties of the emitter can also be specified through other SPH API calls. For example, a function call "setGlobalPose(const NxMat34&)" in the SPH API could be used to invoke a software routine for setting the pose of an existing emitter in the fluid simulation. The function "setGlobalPose" receives a transformation matrix specified by parameter of a 3×4 matrix type "const NxMat34&" and applies the transformation to an emitter in order to rotate the emitter to a particular pose.

A function call "setGlobalPosition(const NxVec3&)" invokes a software routine for setting the location of an existing emitter to coordinates specified by parameter of a 3 dimensional vector type "const NxVec3&".

A function call "setGlobalOrientation(const NxMat33&)" invokes a software routine for setting the orientation of an existing emitter according to a transformation matrix specified by parameter of a 3×3 matrix type "const NxMat33&".

While the functions "setGlobalPose", "setGlobalPosition", and "setGlobalOrientation" establish the properties of the emitter in a "global" coordinate system, the SPH API also generally provides functions for modifying the pose, location, and orientation of the emitter in a local coordinate system. SPH API calls for modifying an emitter's properties in a local coordinate system may be used, for example, to place an emitter on a particular part of an actor within the fluid simulation. That way, properties such as the location, etc. of the emitter can remain fixed relative to the actor, but change relative to the world, e.g., by movement of the actor. Such functions could be invoked, for example by SPH API calls such as "setLocalPose(const NxMat34&)", etc.

The rate of particles emitted by an emitter can also be established by a separate SPH API call. For example, a function call "setRate(NxReal)" invokes a software routine that sets a number of particles emitted by the emitter per unit of time, e.g, particles per second, according to a parameter of type "NxReal".

Similarly, the velocity of particles produced by the emitter can also be set by a separate SPH API call. For example, a function call "setFluidVelocityMagnitude(NxReal)" invokes a software routine for setting a velocity of particles emitted by the emitter. The velocity is specified by a parameter of type "NxReal".

An emitter can be removed from a simulation to stop the production of new particles by using yet another SPH API call. An example of a SPH API call for removing an emitter is a function call "releaseEmitter(NxFluidEmitter&)". The function name "releaseEmitter" denotes a software routine for deleting an emitter from a fluid simulation and the parameter type "NxFluidEmitter&" denotes a reference to the emitter to be deleted.

Another property of particles in a physics simulation that can be set by a SPH API call is a lifetime of the particles. The particle's lifetime is an interval of time between when the particle was created, either by an explicit SPH API call or by an emitter, and when the particle is automatically deleted from the simulation. The lifetime of a particle can be set, for example, by a function call "setParticleLifetime(NxReal)", which invokes a routine setting the lifetime of a particle to a value specified by a parameter of type "NxReal".

In addition to the properties assigned to individual particles, the SPH API can also assign specific properties to all of the particles in the fluid simulation. For example, in one embodiment the SPH API contains calls for setting a stiffness, viscosity, number of particles per linear meter in a rest state, and a density of the fluid in the rest state.

The stiffness of particles is specified by a factor related to pressure. The factor linearly scales the force acting on particles which are closer to each other than a spacing of the particles in the rest state. A good value for the stiffness depends on many factors such as viscosity, damping, and the radius of influence of each particle. Values which are too high will result in an unstable simulation, whereas too low values will make the fluid appear "springy" (the fluid acts more compressible). The SPH API includes a function call "setStiffness(NxReal)" invoking a routine to set the stiffness factor for the simulation according to a parameter of type "NxReal".

The viscosity of the fluid defines its viscous behavior. Higher values result in a honey-like behavior. Viscosity is an effect which depends on the relative velocity of neighboring particles; it reduces the magnitude of the relative velocity. The SPH API includes a function call "setViscosity(NxReal)" invoking a routine to set the viscosity for particles in the fluid simulation according to a parameter of type "NxReal".

The number of particles per linear meter of the fluid in the rest state is the number of particles in a unit volume of the fluid when the net forces on each of the particles is zero. In other words, it is the number of particles that exist in a linear meter of the fluid when the particles are standing still and not acting on each other, i.e., in the "rest state". The SPH API includes a data structure "restParticlesPerMeter" for specifying this parameter. The data structure can be updated by a software routine invoked by the SPH API or it can be directly modified by an application.

The rest density of a fluid is the mass of the fluid per unit volume when the fluid is in the rest state. For example, the rest density of water is about 1000 kilogram per meter cubed at 4 degrees Celsius. This parameter defines indirectly, in combination with the number of particles per linear meter in the rest state, the mass of one particle, i.e. the mass of one particle="rest density"/"particles per cubed meter in the rest state". Particle mass has an impact on repulsion effect on emitters and actors. The repulsion effect is the force generated on the emitters and actors due to Newton's $3^{rd}$ law of physics. The SPH API includes a data structure "restDensity" for specifying the rest density. This data structure can be updated by a software routine invoked by the SPH API or it can be directly modified by the application.

As described above, a fluid simulation may be executed by a main application and a secondary application running in parallel. In particular, the fluid simulation may be executed substantially by the secondary application and another program controlling the physics simulation may be executed by the main application. Accordingly, the SPH API provides a function call for receiving data from the fluid simulation. For example, the main application may include the function call for receiving the data from the secondary application in order to gather and manipulate data related to the fluid simulation. The SPH API includes a function call "setParticlesWriteData (const NxParticleData&)" invoking a routine for receiving data from the fluid simulation. The data is stored in a data structure indicated by a parameter of type "const NxParticleData&".

The system described above is one example of a system that could execute a physics simulation using a SPH API. Other systems adapted to execute physics simulations using an SPH API are disclosed, for example, in U.S. patent applications with Ser. Nos. 10/715,459 and 10/715,440 filed Nov. 19, 2003, Ser. No. 10/815,721 filed Apr. 2, 2004, Ser. No. 10/839,155 filed May 6, 2004, Ser. No. 10/982,791 filed Nov. 8, 2004, and Ser. No. 10/988,588 filed Nov. 16, 2004.

Figure 6:
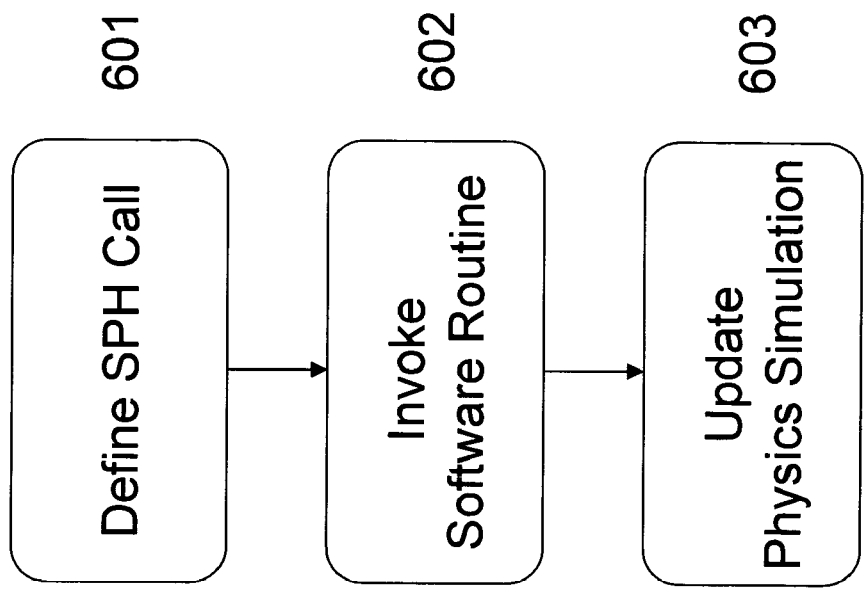

FIG. 6 is a flowchart illustrating a method of executing a physics simulation in a system such as those described above. In the description of FIG. 6, parentheses (XXX) are used to indicate exemplary method steps.

Referring to FIG. 6, the physics simulation is executed by defining an SPH call in the SPH API (601). Then, by operation of the main application, a software routine is invoked using the SPH call (602). For example, the SPH call may be included in the main application so that when the main application executes, the SPH call causes a corresponding software routine to execute. Then, by operation of the secondary application, the physics simulation is updated in response to the software routine (603). For example, the software routine could add or delete an emitter or update various properties of particles in a fluid simulation using any of various SPH API calls described above.

What is claimed is:

1. A computer-implemented method for executing a physics simulation in a computer system that includes a first processor on which a first application and a smoothed particle hydrodynamics (SPH) application programming interface (API) execute and a second processor on which the physics simulation executes, the method comprising:

executing an SPH call;
  transmitting one or more physics parameters generated by the SPH call from the first processor to the second processor;
  invoking a software routine to update the physics simulation;
  updating the physics simulation based on the one or more physics parameters; and
  executing the updated physics simulation to generate an image for display.

2. The method of claim 1, wherein the software routine creates an emitter in a fluid simulation.

3. The method of claim 2, wherein properties of the emitter are specified by a parameter included in the SPH call.

4. The method of claim 3, wherein the properties of the emitter include a size, a location, and a pose of the emitter within the fluid simulation.

5. The method of claim 1, wherein the software routine deletes an emitter from a fluid simulation.

6. The method of claim 1, wherein the software routine adds particles to a fluid simulation.

7. The method of claim 6, wherein properties of the particles are specified by a parameter in the SPH call.

8. The method of claim 7, wherein the properties of the particles include positions and velocities of the particles.

9. The method of claim 1, wherein the software routine receives data from a fluid simulation.

10. The method of claim 1, wherein the software routine sets a stiffness of a fluid in a fluid simulation.

11. The method of claim 1, wherein the software routine sets a viscosity of a fluid in a fluid simulation.

12. The method of claim 1, wherein the software routine updates a data structure specifying a number of particles per linear meter for a fluid in a fluid simulation when the fluid is in a resting state.

13. The method of claim 1, wherein the software routine updates a data structure specifying a rest density for a fluid in a fluid simulation.

14. The method of claim 1, wherein the software routine updates a data structure specifying a radius of influence for particles of a fluid in a fluid simulation.

15. The method of claim 1, wherein the software routine sets a pose of an emitter in a fluid simulation.

16. The method of claim 1, wherein the software routine sets a position of an emitter in a fluid simulation.

17. The method of claim 1, wherein the software routine sets an orientation of an emitter in a fluid simulation.

18. The method of claim 1, wherein the software routine sets a velocity for particles emitted by an emitter in a fluid simulation.

19. The method of claim 1, wherein the software routine sets a rate of particles emitted by an emitter in a fluid simulation.

20. The method of claim 1, wherein the software routine sets a lifetime of a particle in a fluid simulation.

21. The method of claim 1, wherein the first application and the physics simulation run in parallel.

22. The method of claim 21, wherein the first application and the physics simulation communicate with each other asynchronously.

23. The method of claim 22, wherein the first processor comprises a central processing unit (CPU), the second processor comprises another CPU, and the first processor is coupled to the second processor with a peripheral component interconnect (PCI) interface.

24. The method of claim 22, wherein the first processor comprises a CPU, the second processor comprises another CPU, and the first processor is coupled to the second processor with a system bus.

25. The method of claim 1, wherein the SPH API is implemented as part of an operating system in the computer system.

26. The method of claim 1, wherein the SPH API is implemented as part of the first application.

27. A computer system adapted to execute a physics simulation, the computer system comprising:
a memory that includes:
a smoothed particle hydrodynamics (SPH) API,
a first application, and
a physics simulation;
a first processor configured to:
execute the first application,
execute an SPH call included in the SPH API, and
transmit one or more physics parameters generated by the SPH call to a second processor; and
the second processor that is configured to:
invoke a software routine to update the physics simulation based on the one or more physics parameters, and
execute the physics simulation to generate an image for display.

28. The system of claim 27, wherein the software routine creates an emitter in a fluid simulation.

29. The system of claim 28, wherein properties of the emitter are specified by a parameter included in the SPH call.

30. The system of claim 29, wherein the properties of the emitter include a size, a location, and a pose of the emitter within the fluid simulation.

31. The system of claim 27, wherein the software routine deletes an emitter from a fluid simulation.

32. The system of claim 27, wherein the software routine adds particles to a fluid simulation.

33. The system of claim 32, wherein properties of the particles are specified by a parameter in the SPH call.

34. The system of claim 33, wherein the properties of the particles include positions and velocities of the particles.

35. The system of claim 27, wherein the software routine receives data from a fluid simulation.

36. The system of claim 27, wherein the software routine sets a stiffness of a fluid in a fluid simulation.

37. The system of claim 27, wherein the software routine sets a viscosity of a fluid in a fluid simulation.

38. The system of claim 27, wherein the software routine updates a data structure specifying a number of particles per linear meter for a fluid in a fluid simulation when the fluid is in a resting state.

39. The system of claim 27, wherein the software routine updates a data structure specifying a rest density for a fluid in a fluid simulation.

40. The system of claim 27, wherein the software routine updates a data structure specifying a radius of influence for particles of a fluid in a fluid simulation.

41. The system of claim 27, wherein the software routine sets a pose of an emitter in a fluid simulation.

42. The system of claim 27, wherein the software routine sets a position of an emitter in a fluid simulation.

43. The system of claim 27, wherein the software routine sets an orientation of an emitter in a fluid simulation.

44. The system of claim 27, wherein the software routine sets a velocity for particles emitted by an emitter in a fluid simulation.

45. The system of claim 27, wherein the software routine sets a rate of particles emitted by an emitter in a fluid simulation.

46. The system of claim 27, wherein the software routine sets a lifetime of a particle in a fluid simulation.

47. The system of claim 27, wherein the first application and the physics simulation run in parallel.

48. The system of claim 47, wherein the first application and the physics simulation communicate with each other asynchronously.

49. The system of claim 48, wherein the first processor comprises a CPU, the second processor comprises another CPU, and the first processor is coupled to the second processor with a PCI interface.

50. The system of claim 48, wherein the first processor comprises a CPU, the second processor comprises another CPU, and the first processor is coupled to the second processor with a system bus.

51. The system of claim 27, wherein the SPH API is implemented as part of an operating system in the computer system.

52. The system of claim 27, wherein the SPH API is implemented as part of the first application.

* * * * *